May 23, 1933.  M. POWELL  1,909,983
VEGETABLE COOKER
Filed July 29, 1932
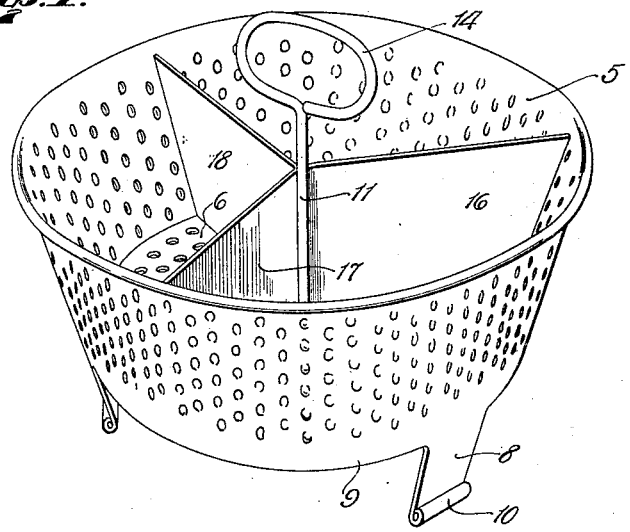
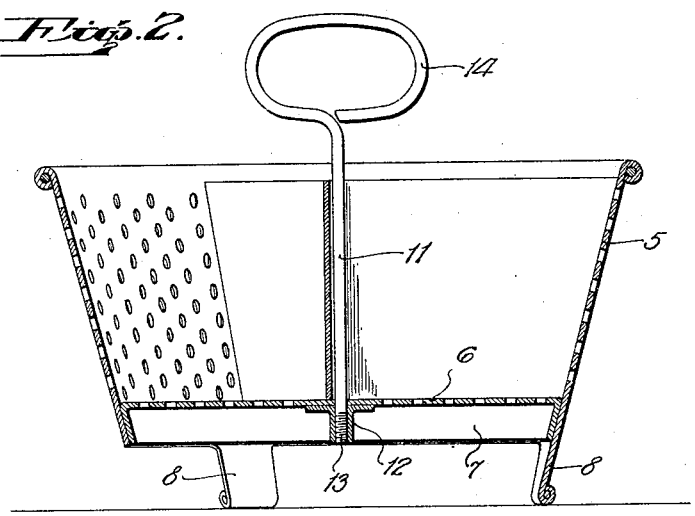
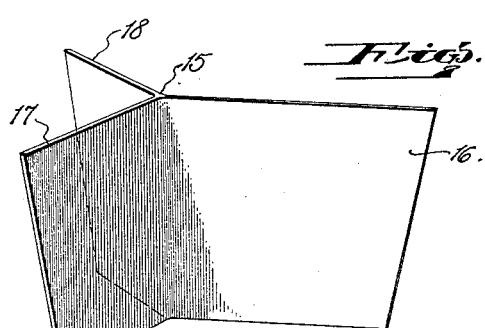
INVENTOR
MILLIE POWELL.
BY
Ely Pattison
ATTORNEYS.

Patented May 23, 1933

1,909,983

UNITED STATES PATENT OFFICE

MILLIE POWELL, OF BROOKLYN, NEW YORK

VEGETABLE COOKER

Application filed July 29, 1932. Serial No. 625,908.

The present invention relates to new and useful improvements in cooking applicances and more particularly it pertains to a novel device for cooking vegetables.

It is well known that vegetables cooked by steam as compared with boiling have greater food value and are more palatable and it is an object of the present invention to provide a cooking receptacle in which vegetables may be cooked by the steaming method.

A further object of the invention resides in the provision of novel means whereby a plurality of vegetables may be cooked simultaneously, the vegetables being separated during the cooking process.

Still a further object of the invention resides in a cooking receptacle which is capable of use in connection with cooking pots or pans of conventional sizes.

With the above and other objects in view, the nature of which will be clearly understood by reference to the following specification and the accompanying claim, reference is had to the accompanying drawing, in which;

Figure 1 is a perspective view of a cooking utensil constructed in accordance with the present invention, Figure 2 is a transverse sectional view thereof, and;

Figure 3 is a perspective view of a partition member adapted for mounting within the receptacle to divide the same into a plurality of compartments.

A device constructed in accordance with the present invention comprises a receptacle 5 which is open at the top and which preferably has perforated side and bottom walls. The receptacle 5 is preferably of larger transverse dimension at the top than at the bottom and the bottom which is designated 6 is formed with a depending flange 7 disposed at an angle to correspond with the angle of the side walls of the receptacle 5. This bottom wall 6 is of such transverse dimension that it will not pass through the smaller open end of the receptacle 5 and the bottom may be secured to the receptacle in any desired manner. The receptacle is provided with supporting legs which serve to maintain the bottom of the receptacle in spaced relation to the bottom of a pot, pan or kettle in which it may be used and these legs which are designated 8 in the drawing are formed as integral extensions of the side walls, the side walls being cut out as at 9 to form the legs 8. Feet 10 may if desired be formed upon the legs by rolling the free end thereof backwardly upon the body portion.

To provide for combined manipulation of the device the vertically extending standard 11 is employed. This standard is preferably detachably secured to the receptacle and for this purpose the bottom 6 has a threaded projection or lug 12 to receive the threaded end 13 of the standard 11. The opposite end of the standard 11 may be provided with an operating handle 14. While I have illustrated the standard 11 as being detachably secured to the receptacle it is obvious that the same may be rigidly secured thereto and not removable if desired.

By reference character 15 designates a partition member and this partition member, in the present embodiment of the invention, has three wings 16, 17 and 18. This partition member is of such proportions that it is readily removable with respect to the receptacle 5 even though the vertically extending standard 11 be in position therein. The partition member 15 is imperforate and divides the receptacle 5 into a plurality of compartments. By reason of the fact that the partition member 15 is imperforate three separate vegetables may be cooked simultaneously without impairing the flavor of each. If, however, it is desired to cook a large quantity of only one vegetable, this may be done by removing the partition member 15 and using only the receptacle 5, or 2 or even all of the compartments may be filled with the vegetable to be cooked without removal of the partition.

From the foregoing it will be apparent that the present invention provides a new and improved device for cooking vegetables by the steaming method which is capable of simultaneously cooking a plurality of vegetables in a highly efficient manner and which is cheap of manufacture.

Having thus described the invention, what is claimed as new, and what it is desired to secure by Letters Patent of the United States, is:

A cooking device comprising a receptacle having perforated side walls and a perforated bottom, an internally threaded lug mounted on the outer face of said perforated bottom, a standard, a thread on one end of said standard for engagement with the internal thread of said lug to secure the standard in an upright position in said receptacle, a handle upon the upper end of said standard, and a multiple walled partition, said partition comprising a rigid non-separable member bodily removable and placeable with respect to the interior of the receptacle without removing said standard.

Signed at New York, New York this 28th day of July, 1932.

MILLIE POWELL.